United States Patent
Sasaki

(10) Patent No.: US 9,446,465 B2
(45) Date of Patent: Sep. 20, 2016

(54) WIRE ELECTRIC-DISCHARGE MACHINING APPARATUS

(71) Applicant: Yuto Sasaki, Tokyo (JP)

(72) Inventor: Yuto Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/420,403

(22) PCT Filed: Oct. 30, 2012

(86) PCT No.: PCT/JP2012/078071
§ 371 (c)(1),
(2) Date: Feb. 9, 2015

(87) PCT Pub. No.: WO2014/068684
PCT Pub. Date: May 8, 2014

(65) Prior Publication Data
US 2015/0217390 A1    Aug. 6, 2015

(51) Int. Cl.
*B23H 1/02* (2006.01)
*B23H 7/04* (2006.01)

(52) U.S. Cl.
CPC ............... *B23H 1/02* (2013.01); *B23H 1/022* (2013.01); *B23H 7/04* (2013.01)

(58) Field of Classification Search
CPC ........... B23H 1/02; B23H 1/022; B23H 7/04
USPC ................ 219/69.13, 69.12, 69.18
See application file for complete search history.

(56) References Cited

U.S. PATENT DOCUMENTS

| 5,317,122 A | 5/1994 | Ito et al. |
| 5,380,974 A * | 1/1995 | Kaneko ............... B23H 7/04 219/69.12 |
| 5,416,290 A * | 5/1995 | Magara ............... B23H 1/022 219/69.18 |
| 6,756,557 B1 * | 6/2004 | Ukai ............... B23H 1/022 219/69.13 |
| 6,903,297 B2 | 6/2005 | Goto et al. |
| 8,138,442 B2 | 3/2012 | Sato et al. |

(Continued)

FOREIGN PATENT DOCUMENTS

| JP | 61-293717 A | 12/1986 |
| JP | 62-287917 A | 12/1987 |

(Continued)

OTHER PUBLICATIONS

International Search Report for PCT/JP2012/078071 dated Jan. 22, 2013.

*Primary Examiner* — David Angwin
*Assistant Examiner* — John J Norton
(74) *Attorney, Agent, or Firm* — Sughrue Mion, PLLC

(57) ABSTRACT

A control unit controls an on/off operation of a switching unit such that a first DC pulse voltage is applied across an electrode gap from a pulse-voltage generation unit adjusted to a first impedance, and when a detection unit detects a preliminary discharge, a second DC pulse voltage is applied across the electrode gap from the pulse-voltage generation unit adjusted to a second impedance, which is lower than the first impedance, so as to generate a main discharge in the electrode gap, and during an idle time since the main discharge is completed until the next preliminary discharge is started, a third DC pulse voltage that is equal to or higher than a discharge arc voltage is applied across the electrode gap from the pulse-voltage generation unit adjusted to a third impedance, which is higher than the first impedance.

4 Claims, 4 Drawing Sheets

(56) References Cited

U.S. PATENT DOCUMENTS

| | | | |
|---|---|---|---|
| 8,309,876 B2 | 11/2012 | Hashimoto et al. | |
| 2002/0060205 A1* | 5/2002 | Tamida | B23H 1/022 219/69.18 |
| 2009/0225573 A1* | 9/2009 | Sugawara | H01M 10/42 363/56.01 |
| 2010/0308017 A1 | 12/2010 | Hashimoto et al. | |

FOREIGN PATENT DOCUMENTS

| | | | |
|---|---|---|---|
| JP | 01-234114 A | 9/1989 | |
| JP | 05-269623 A | 10/1993 | |
| JP | 08-257839 A | 10/1996 | |
| JP | 10-244423 A | 9/1998 | |
| JP | 2001-157921 A | 6/2001 | |
| JP | 2004-050298 A | 2/2004 | |
| JP | 2004-214632 A | 7/2004 | |
| JP | 2004-289935 A | 10/2004 | |
| JP | 2005-297164 A | 10/2005 | |
| TW | 201006595 A * | 2/2010 | B23H 1/02 |
| WO | 02/102538 A1 | 12/2002 | |
| WO | 2007/057948 A1 | 5/2007 | |
| WO | 2009/096025 A1 | 8/2009 | |
| WO | 2009/096026 A1 | 8/2009 | |

* cited by examiner

WIRE ELECTRIC-DISCHARGE MACHINING APPARATUS

CROSS REFERENCE TO RELATED APPLICATIONS

This application is a National Stage of International Application No. PCT/JP2012/078071 filed Oct. 30, 2012, the contents of all of which are incorporated herein by reference in their entirety.

FIELD

The present invention relates to a wire electric-discharge machining apparatus.

BACKGROUND

Patent Literature 1 describes an electric-discharge machining apparatus that detects a gap state with respect to each of machining pulses applied to a machining gap by a check pulse in an initial stage. Specifically, a check-pulse generation circuit generates the check pulse after a delay by a time period during which a switch-on start signal is output and the electrode gap voltage becomes sufficient for electric discharge. A gap-state determination circuit compares the detection voltage of the machining gap with a reference voltage only during a generation period of the check pulse, so as to determine the presence of occurrence of an abnormality such as sustained arc discharge or a short circuit. With this configuration, according to Patent Literature 1, when an abnormality such as a sustained arc discharge or a short circuit has occurred, the abnormality is eliminated, and normal electric discharge is generated within a short time thereafter. Accordingly, the frequency of the normal electric discharge can be increased, and the machining speed can be increased.

Patent Literature 2 describes an electric-discharge machining apparatus that applies an alternating current (AC) voltage to an electrode gap only during a pause time of the pulse voltage application, in order to detect the degree of insulation of the insulating machining fluid present in the electrode gap. With this configuration, according to Patent Literature 2, the true factor of electric-discharge concentration is detected without detecting the deterioration of the degree of insulation due to field metal ions, which are not the factor in electric-discharge concentration, to perform abnormality determination in the electrode gap by comparing the detection result with a reference value. When an abnormality is detected, control is executed to recover a state of the electrode gap, and thus machining speed does not decrease.

Patent Literature 3 describes an electric-discharge machining apparatus set with an idle time between rough machining in which a rough-machining power supply is energized to apply a machining voltage to a load unit to perform cutting and finish machining in which a high-frequency finishing power supply is energized to apply the machining voltage to the load unit to perform surface finishing. With this configuration, according to Patent Literature 3, a voltage can be applied between machining electrodes after impedance between the machining electrodes is recovered during the idle time, thereby enabling machining to be performed efficiently.

CITATION LIST

Patent Literatures

Patent Literature 1: Japanese Patent Application Laid-open No. S61-293717

Patent Literature 2: Japanese Patent Application Laid-open No. S62-287917

Patent Literature 3: Japanese Patent Application Laid-open No. 2001-157921

SUMMARY

Technical Problem

In wire electric-discharge machining in which preliminary discharge and main discharge are repeated to continue machining, an idle time for recovering the insulation of the electrode gap in which an arc current due to a pulse voltage for the main discharge attenuates is set between the pulse voltage for the main discharge and the pulse voltage for the preliminary discharge. If the idle time is not sufficient, the pulse voltage for the preliminary discharge is applied before the arc current due to the pulse voltage for the main discharge has attenuated, and the arc current may flow without being interrupted. Therefore, the idle time needs to be set to a sufficient length.

In Patent Literature 1, there is no description regarding preliminary discharge, and there is no description either regarding how to improve machining speed when performing electric-discharge machining by repeating the preliminary discharge and the main discharge.

In the technique described in Patent Literature 1, the check pulse is generated only for detecting the electric-discharge state after the electrode gap voltage becomes sufficient for electric discharge. It is assumed that the check pulse itself does not induce electric discharge, and thus it is difficult to improve the discharge frequency as well as the machining speed.

In Patent Literature 2, there is no description regarding preliminary discharge, and there is no description either regarding how to improve the machining speed when performing electric-discharge machining by repeating the preliminary discharge and the main discharge.

In the technique described in Patent Literature 2, an AC voltage is applied across the electrode gap only for detecting the degree of insulation of the insulating machining fluid during the pause time of the pulse voltage application. It is considered that the AC voltage itself does not induce electric discharge, and thus it is difficult to improve a discharge frequency as well as the machining speed.

In Patent Literature 3, there is no description regarding preliminary discharge, and there is no description either regarding how to improve the machining speed when performing electric-discharge machining by repeating the preliminary discharge and the main discharge.

In the technique described in Patent Literature 3, it is assumed that a voltage is not applied between the machining electrodes in the idle time, and thus it is difficult to improve the discharge frequency as well as the machining speed.

The present invention has been achieved in view of the above problems, and an object of the present invention is to provide a wire electric-discharge machining apparatus that can improve the machining speed when performing electric-discharge machining by repeating preliminary discharge and main discharge.

Solution to Problem

In order to solve the aforementioned problems, a wire electric-discharge machining apparatus is configured to include: a pulse-voltage generation unit that has a plurality of power supplies and generates a DC pulse voltage to be applied to an electrode gap between a wire electrode and a workpiece; a switching unit that selects a power supply from the plurality of power supplies to adjust impedance of the pulse-voltage generation unit and turns on/off application of voltage from the selected power supply to the electrode gap; a detection unit that detects an electric discharge state in the electrode gap; and a control unit that controls an on/off operation of the switching unit such that a first DC pulse voltage is applied across the electrode gap from the pulse-voltage generation unit adjusted to a first impedance, and after the first DC pulse voltage is applied across the electrode gap, when the detection unit detects preliminary discharge, a second DC pulse voltage is applied across the electrode gap from the pulse-voltage generation unit adjusted to a second impedance, which is lower than the first impedance, so as to generate a main discharge in the electrode gap, and during an idle time since application of the second DC pulse voltage is completed until application of the next first DC pulse voltage is started, a third DC pulse voltage that is equal to or higher than a discharge arc voltage is applied across the electrode gap from the pulse-voltage generation unit adjusted to a third impedance, which is higher than the first impedance.

Advantageous Effects of Invention

According to the present invention, an electrode gap can be charged to an arc potential or higher, before applying a first direct current (DC) pulse voltage by application of a third DC pulse voltage in an idle time. Alternatively, the electrode gap state can be maintained stably by weak electric discharge generated by the third DC pulse voltage. Therefore, preliminary discharge by the first DC pulse voltage can be induced in a short time thereafter, thereby enabling to increase discharge frequency. As a result, the machining speed when performing electric-discharge machining by repeating the preliminary discharge and main discharge can be improved.

DESCRIPTION OF EMBODIMENTS

Exemplary embodiments of a wire electric-discharge machining apparatus according to the present invention will be explained below in detail with reference to the accompanying drawings. The present invention is not limited to the embodiments.

First Embodiment.

Figure 1:
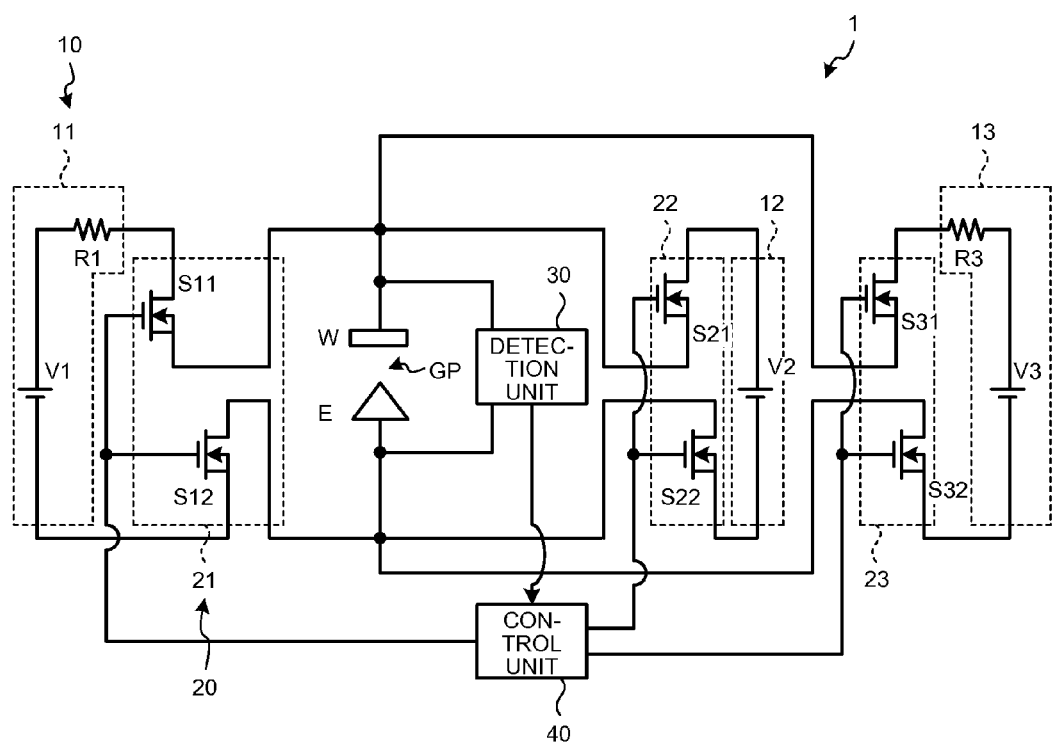
FIG. 1 shows a configuration of a wire electric-discharge machining apparatus according to a first embodiment.

A wire electric-discharge machining apparatus 1 according to a first embodiment is explained with reference to FIG. 1. FIG. 1 shows a configuration of the wire electric-discharge machining apparatus 1.

The wire electric-discharge machining apparatus 1 generates arc discharge in an electrode gap GP between a wire electrode E and a workpiece W, to thereby perform machining (for example, melt cutting on) the workpiece W.

Specifically, when a first DC pulse voltage V1 for preliminary discharge is applied across the electrode gap GP to generate the arc discharge, the wire electric-discharge machining apparatus 1 applies a second DC pulse voltage V2 for main discharge, different from the first DC pulse voltage V1, to the electrode GP to develop the arc discharge, thereby generating an arc current having a short pulse and a high peak, to machine (for example, to perform the melt cutting on) the workpiece W by heat generated at that time. That is, the wire electric-discharge machining apparatus 1 alternately repeats the preliminary discharge and the main discharge to continue machining.

At this time, a period for recovering insulation of the electrode gap GP in which the arc current due to the second DC pulse voltage V2 for the main discharge attenuates is required between the second DC pulse voltage V2 for the main discharge and the first DC pulse voltage V1 for the preliminary discharge. A period since application of the second DC pulse voltage V2 for the main discharge is complete until application of the next first DC pulse voltage V1 is started is referred to as "idle time Tid".

If the idle time Tid is not sufficient, the first DC pulse voltage V1 for the preliminary discharge is applied before the arc current due to the second DC pulse voltage V2 for the main discharge has attenuated, and the arc current may flow without being interrupted. When considered from the viewpoint of machining speed, it is effective to continuously cause the arc current to flow to increase a heat quantity to be generated and melt of the workpiece W. However, the wire electrode E also melts and is worn away simultaneously. If the heat quantity is too large, the wire electrode E is disconnected, thereby decreasing machining efficiency adversely. Accordingly, the idle time needs to be set to a sufficient length.

When it is assumed that electric discharge is not performed at all in the idle time Tid, if the idle time Tid is set to a sufficient length, it becomes difficult to improve the discharge frequency as well as the machining speed.

On the other hand, according to the present embodiment, control is executed to increase the numbers of causing the arc current to flow, while suppressing power of the arc current (the current in the electrode gap GP) to an extent to which the wire electrode E is not disconnected during the idle time Tid, aiming at increasing the discharge frequency and the machining speed by generating weak electric discharge.

Specifically, the wire electric-discharge machining apparatus 1 includes the wire electrode E, the workpiece W, a pulse-voltage generation unit 10, a switching unit 20, a detection unit 30, and a control unit 40.

The pulse-voltage generation unit 10 generates a DC pulse voltage to be applied to the electrode GP between the wire electrode E and the workpiece W. The pulse-voltage generation unit 10 is configured to have a plurality of power supplies, so that impedance can be adjusted according to which power supply of the plurality of power supplies is selected.

For example, the pulse-voltage generation unit 10 includes a first power supply 11, a second power supply 12, and a third power supply 13. The first power supply 11 has first impedance. For example, the first power supply 11 includes a DC power supply V1, and a resistive element R1 having a resistance value corresponding to the first impedance. The resistive element R1 is provided on a current pathway from the DC power supply V1 to the electrode gap GP to restrict current flowing from the DC power supply V1 to the electrode gap GP.

The second power supply 12 has second impedance lower than the first impedance. For example, the second power supply 12 includes a DC power supply V2. However, because the second power supply 12 does not include the resistive element, the second power supply 12 has the second impedance due to a circuit having only electric wires or the like. Because the second power supply 12 does not include the resistive element on a current pathway from the DC power supply V2 to the electrode gap GP, the second power supply 12 can flow an electric current having a high peak, but with a shorter rising time than the first and third power supplies 11 and 13 into the electrode gap GP.

The third power supply 13 has third impedance higher than the first impedance. Because the third impedance is higher than the first impedance, the third impedance is higher than the second impedance. For example, the third power supply 13 includes a DC power supply V3, and a resistive element R3 having a resistance value corresponding to the third impedance. For example, the resistance value of the resistive element R3 is higher than the resistance value of the resistive element R1 so as to handle a fact that the third impedance is higher than the first impedance. The resistive element R3 is provided on a current pathway from the DC power supply V3 to the electrode gap GP to restrict the current flowing from the DC power supply V3 to the electrode gap GP.

The switching unit 20 selects a power supply among the power supplies 11 to 13 to adjust the impedance of the pulse-voltage generation unit 10. For example, the switching unit 20 adjusts the impedance of the pulse-voltage generation unit 10 to the first impedance by selecting the first power supply 11. Alternatively, for example, the switching unit 20 adjusts the impedance of the pulse-voltage generation unit 10 to the second impedance by selecting the second power supply 12. Alternatively, for example, the switching unit 20 adjusts the impedance of the pulse-voltage generation unit 10 to the third impedance by selecting the third power supply 13.

The switching unit 20 turns on or off application of voltage from the selected power supply to the electrode gap GP. For example, the switching unit 20 includes a plurality of switching units for connecting in parallel the respective power supplies 11 to 13 to the electrode gap GP independently from each other.

For example, the switching unit 20 has a first switching unit 21, a second switching unit 22, and a third switching unit 23. The first switching unit 21 is provided between the first power supply 11 and the electrode gap GP to turn on or off the application of voltage from the first power supply 11 to the electrode gap GP. For example, the first switching unit 21 includes switching elements S11 and S12. The switching element S11 electrically connects or disconnects, for example, between the first power supply 11 and the workpiece W. The switching element S12 electrically connects or disconnects, for example, between the first power supply 11 and the wire electrode E.

The second switching unit 22 is provided between the second power supply 12 and the electrode gap GP to turn on or off the application of voltage from the second power supply 12 to the electrode gap GP. For example, the second switching unit 22 includes switching elements S21 and S22. The switching element S21 electrically connects or disconnects, for example, between the second power supply 12 and the workpiece W. The switching element S22 electrically connects or disconnects, for example, between the second power supply 12 and the wire electrode E.

The third switching unit 23 is provided between the third power supply 13 and the electrode gap GP to turn on or off application of voltage from the third power supply 13 to the electrode gap GP. For example, the third switching unit 23 includes switching elements S31 and S32. The switching element S31 electrically connects or disconnects, for example, between the third power supply 13 and the workpiece W. The switching element S32 electrically connects or disconnects, for example, between the third power supply 13 and the wire electrode E.

The detection unit 30 detects an electric discharge state in the electrode gap GP. For example, the detection unit 30 is connected in parallel to the electrode gap GP to monitor voltage of the electrode gap GP, and determines as to whether the monitored voltage of the electrode gap GP is higher than a reference value. The detection unit 30 transmits a comparison result (for example, a signal indicating an H level when the voltage is higher, and an L level when the voltage is lower) as information indicating the presence of occurrence of electric discharge to the control unit 40.

The control unit 40 instructs to turn on or off the switching elements S11 to S32 of the switching unit 20 according to the information from the detection unit 30 to control oscillation of the entire apparatus.

Figure 2:
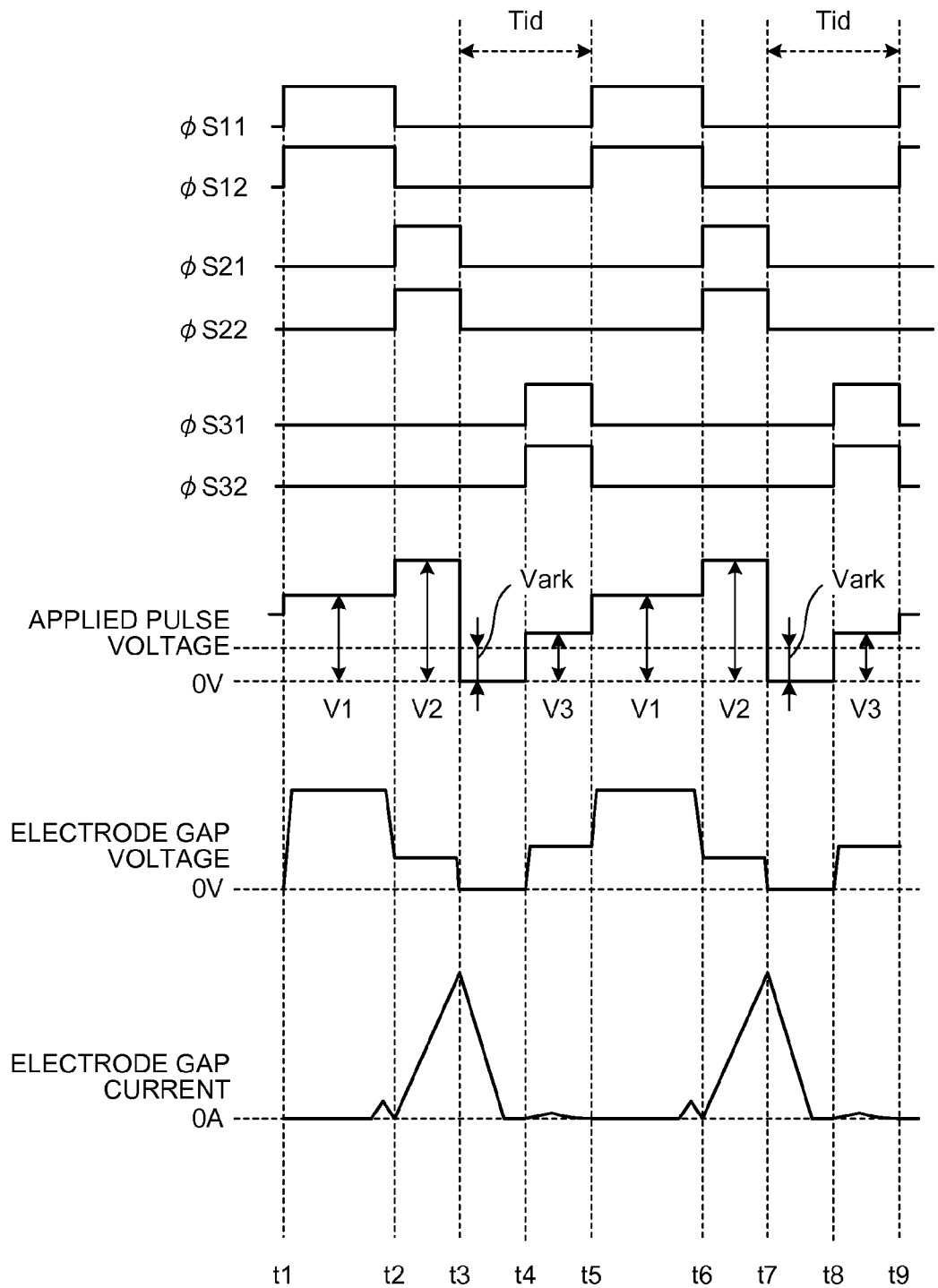
FIG. 2 shows an operation of the wire electric-discharge machining apparatus according to the first embodiment.

An operation of the wire electric-discharge machining apparatus 1 is explained with reference to FIG. 2. FIG. 2 shows an operation of the wire electric-discharge machining apparatus 1.

For example, at the start of machining, at a timing t1, the control unit 40 turns on the switching elements S11 and S12 of the first switching unit 21 to apply a first DC pulse voltage V1 to the electrode gap GP from the first power supply 11.

At a timing t2, when insulation of the electrode gap GP is broken down to generate the preliminary discharge, the detection unit 30 detects generation of electric discharge. Therefore, the control unit 40 turns off the switching elements S11 and S12 of the first switching unit 21, and turns on the switching elements S21 and S22 of the second switching unit 22, while the arc current is sustained, to apply the second DC pulse voltage V2 to the electrode gap GP from the second power supply 12, so that a larger current than the arc current generated by the arc discharge flows to the electrode gap GP, thereby performing melting process of the workpiece W. The time width of the second DC pulse voltage V2 is set according to a machining state of the electrode gap GP.

The arc current by the second DC pulse voltage V2 reaches a peak at the timing t3 by turning off the switching elements S21 and S22 of the second switching unit 22 in response to a command from the control unit 40. Thereafter, the arc current by the second DC pulse voltage V2 attenuates to a certain degree. The idle time Tid is then started at the timing t3.

At the timing t4 during the idle time Tid, the control unit 40 turns on the switching elements S31 and S32 of the third switching unit 23 to apply a third DC pulse voltage V3 from the third power supply 13 such that the voltage becomes equal to or higher than then arc voltage Vark. The arc voltage Vark is a gap voltage when the insulation of the electrode gap GP is broken down and electric discharge is being generated, and in order to break down the insulation of the electrode gap GP, a voltage equal to or higher than the arc voltage is required. For example, if the workpiece W is made of a steel material, the arc voltage is about 20 volts. It is assumed that a time width of the third DC pulse voltage V3 corresponds to a set time width of the second DC pulse voltage V2, that is, magnitude of the arc current immediately before. Amplitude of the third DC pulse voltage V3 is smaller than that of the first DC pulse voltage V1 and that of the second DC pulse voltage V2. Accordingly, the insulation can be broken down to generate weak electric discharge, and machining debris can be removed by electric discharge with the machining debris accumulating in the electrode gap GP. Furthermore, by removing irregularities of machining marks on the surface of the workpiece W, the electrode gap GP can be maintained in a stable state, thereby enabling to induce the preliminary discharge by the first DC pulse voltage V1 immediately thereafter, and to improve the discharge frequency, that is, to realize high-speed machining.

A distance of the electrode gap GP is controlled by a numerical control device or a servo-drive control device so that electric discharge is generated in the electrode gap GP.

At a timing t5, the idle time Tid finishes. At timings t5 to t8, similar processes to those at the timings t1 to t4 are performed.

As described above, according to the first embodiment, in the wire electric-discharge machining apparatus 1, the control unit 40 controls an on/off operation of the switching unit 20 so that the first DC pulse voltage V1 is applied across the electrode gap GP from the pulse-voltage generation unit 10 adjusted to the first impedance, and after the first DC pulse voltage V1 is applied across the electrode gap GP, when the detection unit 30 detects the preliminary discharge, the second DC pulse voltage V2 is applied across the electrode gap GP from the pulse-voltage generation unit 10 adjusted to the second impedance being lower than the first impedance, so as to generate the main discharge in the electrode gap GP, and during the idle time Tid since the second DC pulse voltage V2 is completed until the next first DC pulse voltage V1 is started, the third DC pulse voltage V3 being equal to or higher than the discharge arc voltage Vark is applied across the electrode gap GP from the pulse-voltage generation unit 10 adjusted to the third impedance being higher than the first impedance. That is, the electrode gap GP can be charged to the arc potential Vark or higher by application of the third DC pulse voltage V3 during the idle time Tid before the first DC pulse voltage V1 is applied, or a state of the electrode gap GP can be maintained stably by the weak electric discharge generated by the third DC pulse voltage V3. Accordingly, the preliminary discharge by the first DC pulse voltage V1 can be induced thereafter in a short time, thereby enabling to increase the discharge frequency. As a result, the machining speed at the time of performing the electric-discharge machining by repeating the preliminary discharge and the main discharge can be improved.

FIG. 2 shows a case as an example in which the third DC pulse voltage V3 is not applied in the former half of the idle time Tid, that is, during t3 to t4, and the third DC pulse voltage V3 is applied in the latter half of the idle time Tid, that is, during t4 to t5. However, the application of the third DC pulse voltage V3 can be in another partial period of the idle time Tid, so long as the preliminary discharge by the first DC pulse voltage V1 at t5 immediately after the idle time Tid can be induced. For example, the application of the third DC pulse voltage V3 can be started in a period from t3 to t4 in the middle of the former half of the idle time Tid, and the application of the third DC pulse voltage V3 can be finished during a period from t4 to t5 in the middle of the latter half of the idle time Tid.

In FIG. 2, all the polarities of the first DC pulse voltage V1, the second DC pulse voltage V2, and the third DC pulse voltage V3 are the same direction. However, the polarity of only the first DC pulse voltage V1, only the second DC pulse voltage V2, only the third DC pulse voltage V3, or the polarities of a plurality of DC pulse voltages can be changed.

Second Embodiment.

Figure 3:
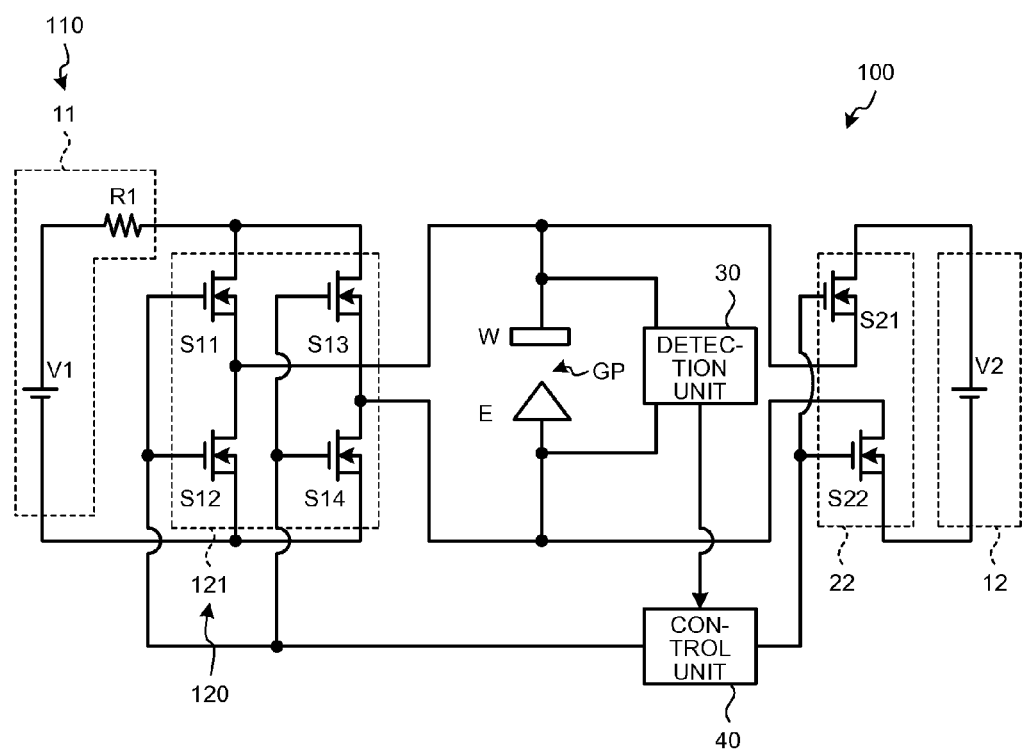
FIG. 3 shows a configuration of a wire electric-discharge machining apparatus according to a second embodiment.

A wire electric-discharge machining apparatus 100 according to a second embodiment is explained next with reference to FIG. 3. FIG. 3 shows a configuration of the wire electric-discharge machining apparatus 100. In the following descriptions, constituent elements different from those of the first embodiment are mainly explained.

In the first embodiment, three types of DC power supplies V1 to V3 are prepared to generate three types of DC pulse voltages V1 to V3 by selecting either of these. However, in the second embodiment, while using two types of DC power supplies V1 and V2, the DC power supply V1 is used as a substitute for the DC power supply V3 by changing the oscillation control method, to generate three types of DC pulse voltages V1 to V3'.

Specifically, as shown in FIG. 3, the wire electric-discharge machining apparatus 100 includes a pulse-voltage generation unit 110 and a switching unit 120, instead of the pulse-voltage generation unit 10 and the switching unit 20 (see FIG. 1). The pulse-voltage generation unit 110 does not include the third power supply 13 (see FIG. 1). The switching unit 120 does not include the third switching unit 23 (see FIG. 1), and includes a first switching unit 121 instead of the first switching unit 21. The first switching unit 121 includes a plurality of switching elements S11 to S14. The switching elements S11 to S14 are full-bridge connected between the first power supply 11 and the electrode gap GP.

That is, the wire electric-discharge machining apparatus 100 has such a configuration that the third power supply 13 and the third switching unit 23 are omitted from the wire electric-discharge machining apparatus 1 (see FIG. 1), and the third DC pulse voltage V3' is substituted by a modification of the oscillation control method of the first switching unit 121, thereby enabling to reduce the circuit size.

Figure 4:
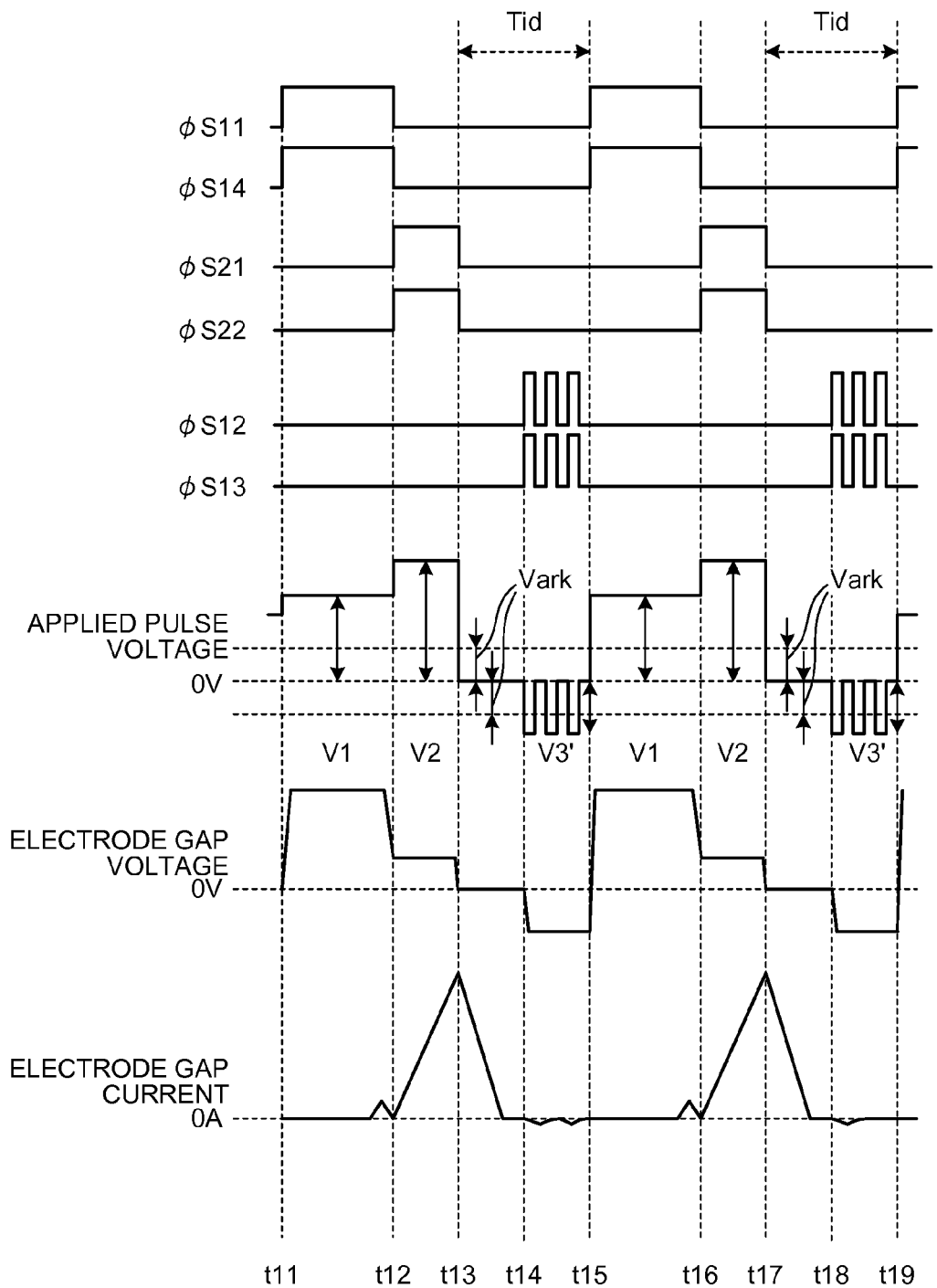
FIG. 4 shows an operation of the wire electric-discharge machining apparatus according to the second embodiment.

Specifically, as shown in FIG. 4, the third DC pulse voltage V3' is formed in a group pulse in which on/off is repeated cyclically. Accordingly, the third DC pulse voltage V3' (the group pulse) having an amplitude equivalent to the third DC pulse voltage V3 of the first embodiment can be obtained as a time-averaged effective amplitude, while using the DC power supply V1, thereby enabling to realize identical effects as those of the first embodiment.

As an advantage of forming the third DC pulse voltage V3' in a group-pulse form, if the arc current from the main discharge is drawn due to application of the third DC pulse voltage V3', the arc current can be interrupted by an off period in the group pulse. Accordingly, heat generation of the wire electrode E can be reduced, and disconnection of the wire electrode E can be suppressed, thereby enabling to further improve the machining efficiency.

The switching elements S11 to S14 of the first switching unit 121 according to the present embodiment are formed in a full-bridge circuit, and when a first diagonal arm (the switching elements S11 and S14) and a second diagonal arm (the switching elements S12 and S13) are alternatively turned on, the polarity of the DC pulse voltage to be applied across the electrode gap GP can be changed.

For example, the polarity of the third DC pulse voltage V3' is inverted to the polarity of the first DC pulse voltage V1 and the polarity of the second DC pulse voltage V2 and is applied across the electrode gap GP. For example, in a period of timings t11 to t12 during which the first DC pulse voltage V1 should be applied across the electrode gap GP, the switching elements S11 and S14 are turned on, and in a period of timings t14 to t15 during which the third DC pulse voltage V3' should be applied across the electrode gap GP, the switching elements S12 and S13 are intermittently turned on and off. Accordingly, an electrostatic force in the electrode gap GP can be inverted to oscillate the wire electrode E that is a non-rigid body, and generation of weak electric discharge can be further promoted.

As described above, according to the second embodiment, the control unit 40 controls an on/off operation of the switching unit 120 such that the third DC pulse voltage V3' is applied across the electrode gap GP in a group-pulse form. That is, by forming the DC pulse voltage in a group-pulse form, a rapid rise can be prevented, and a voltage value can be set to low in a steady state to generate weak electric discharge, thereby enabling to induce the preliminary discharge by the first DC pulse voltage V1 thereafter, and thus the discharge frequency can be increased to improve the machining speed. Furthermore, if the arc current by the main discharge continuously flows without interruption, the arc current can be interrupted in the off period of the group pulse. Accordingly, heat generation of the wire electrode E can be reduced, and disconnection of the wire electrode E can be suppressed.

According to the second embodiment, the control unit 40 controls an on/off operation of the switching unit 120 such that the polarity of the third DC pulse voltage V3' is inverted so as to have polarity that is opposite to that of the first DC pulse voltage V1 and that of the second DC pulse voltage V2. Accordingly, the electrostatic force in the electrode gap GP can be inverted to oscillate the wire electrode E by an electrostatic attractive force or a reaction force, and the distance of the electrode gap GP can be changed. Therefore, generation of weak electric discharge can be further promoted. Furthermore, the second embodiment is effective for improvement of machining shapes.

After the third DC pulse voltage V3' formed in a group-pulse state is applied, if the voltage does not rise to the discharge arc potential Vark or higher within a specified time, the control unit 40 can control the on/off operation of the switching unit 120 according to the voltage level of the rising edge detected by the detection unit 30, so as to extend the off period of the group pulse in the third DC pulse voltage V3' or stop the application of the pulse.

For example, a voltage value of the electrode gap GP by the third DC pulse voltage V3' is monitored by the detection unit 30, and if the voltage of the electrode gap GP has never risen to the arc voltage before the second on-time of the group pulse has passed, the arc current can be interrupted more reliably by extending the off-time after the third on-time. Further, if the voltage of the electrode gap GP does not rise to the arc voltage before the fourth on-time has passed, the application of the pulse voltage can be stopped. Accordingly, the arc current can be completely interrupted, thereby enabling to avoid disconnection of the wire electrode E.

That is, when the voltage does not rise to the arc voltage Vark or higher, the arc current due to the main discharge immediately before is continuously flowing or the electrode gap GP is being short-circuited. Whichever the case may be, the wire electrode E generates heat due to a short-circuit current by the applied voltage and assists disconnection of the wire electrode E. Therefore, in such a state, the off period of the group pulse is first extended, and if the state is not resolved thereafter, disconnection of the wire electrode E can be suppressed by stopping the application of the group pulse voltage.

In the configuration shown in FIG. 3, each of the switching elements S11 to S14 can be formed by a wide bandgap semiconductor. For the wide bandgap semiconductor, a semiconductor including, for example, at least one of silicon carbide, a gallium nitride material, and diamond can be used. By forming each of the switching elements S11 to S14 from the wide bandgap semiconductor, a switching operation of the group pulse can be performed at a high speed, and particularly, the wide bandgap semiconductor is effective to interrupt the arc current by the off period of the group pulse, when the arc current is drawn from the main discharge. Further, the wide bandgap semiconductor is effective to improve an element life by realizing low on-resistance of the switching elements.

That is, by using the wide bandgap semiconductor, the switching operation can be performed at a high speed, and particularly, the wide bandgap semiconductor is effective to interrupt the arc current by the off period of the group pulse in the above state. Further, the wide bandgap semiconductor is effective for voltage endurance life of the switching elements by realizing the low on-resistance of the switching elements.

INDUSTRIAL APPLICABILITY

As described above, the wire electric-discharge machining apparatus according to the present invention is useful for wire electric-discharge machining.

REFERENCE SIGNS LIST 1, 100 wire electric-discharge machining apparatus, 10, 110 pulse-voltage generation unit, 11 first power supply, 12 second power supply, 13 third power supply, 20, 120 switching unit, 21, 121 first switching unit, 22 second switching unit, 23 third switching unit, 30 detection unit, 40 control unit.

The invention claimed is:

1. A wire electric-discharge machining apparatus comprising:
a pulse-voltage generation unit that has a plurality of power supplies and generates a DC pulse voltage to be applied across an electrode gap between a wire electrode and a workpiece;
a switching unit that selects a power supply from the plurality of power supplies to adjust impedance of the pulse-voltage generation unit and turns on/off application of voltage from the selected power supply to the electrode gap;
a detection unit that detects an electric discharge state in the electrode gap; and
a control unit configured to control an on/off operation of the switching unit such that a first DC pulse voltage is applied across the electrode gap from the pulse-voltage generation unit adjusted to a first impedance, and after the first DC pulse voltage is applied across the electrode gap, when the detection unit detects a preliminary discharge, a second DC pulse voltage is applied across the electrode gap from the pulse-voltage generation unit adjusted to a second impedance, which is lower than the first impedance, so as to generate a main discharge in the electrode gap, and during an idle time since application of the second DC pulse voltage is completed until application of the next first DC pulse voltage is started, a third DC pulse voltage that is equal to or higher than a discharge arc voltage is applied across the electrode gap from the pulse-voltage generation unit adjusted to a third impedance, which is higher than the first impedance, wherein
the first DC pulse voltage has an amplitude and a time width for generating the preliminary discharge, and the control unit configured to apply the third DC pulse voltage across the electrode gap in a group-pulse form and controls the on/off operation of the switching unit such that the polarity of the third DC pulse voltage in the group-pulse form is inverted so as to have polarity that is opposite to that of the first DC pulse voltage and that of the second DC pulse voltage, and an absolute value of a time-averaged effective amplitude of the group pulse of the third DC pulse voltage becomes smaller than the absolute value of an amplitude of the first DC pulse voltage and smaller than the absolute value of the amplitude of the second DC pulse voltage.

2. The wire electric-discharge machining apparatus according to claim 1, wherein the third DC pulse voltage is applied to the electrode gap during a duration of the idle time in which the preliminary discharge by the first DC pulse voltage can be induced.

3. The wire electric-discharge machining apparatus according to claim 1, wherein after the third DC pulse voltage that is in the group-pulse form is applied, if the voltage does not rise to a discharge arc potential or higher within a specified time, the control unit controls the on/off operation of the switching unit according to a voltage level of the rising edge detected by the detection unit, so as to extend an off period of the group pulse in the third DC pulse voltage or stop the application of the pulse.

4. The wire electric-discharge machining apparatus according to claim 3, wherein
  the switching unit includes a plurality of switching elements and
  each of the switching elements is formed by a wide bandgap semiconductor.

* * * * *